United States Patent [19]

Harper

[11] Patent Number: 4,877,906
[45] Date of Patent: Oct. 31, 1989

[54] PURIFICATION OF POLYOLS PREPARED USING DOUBLE METAL CYANIDE COMPLEX CATALYSTS

[75] Inventor: Stephen D. Harper, West Chester, Pa.

[73] Assignee: Arco Chemical Technology, Inc., Wilmington, Del.

[21] Appl. No.: 276,275

[22] Filed: Nov. 25, 1988

[51] Int. Cl.$^4$ .................... C07C 41/34; C07C 41/44
[52] U.S. Cl. ................................ 568/621; 568/616; 568/617
[58] Field of Search .................. 568/621, 616, 617

[56] References Cited

U.S. PATENT DOCUMENTS

| | | | |
|---|---|---|---|
| 3,278,459 | 10/1966 | Herold | 260/2 |
| 3,941,849 | 3/1976 | Herold | 260/607 |
| 4,355,188 | 10/1982 | Herold et al. | 568/620 |
| 4,721,818 | 1/1988 | Harper et al. | 568/120 |

*Primary Examiner*—Howard T. Mars
*Attorney, Agent, or Firm*—Stephen D. Harper

[57] ABSTRACT

A method for removing double metal cyanide complex catalyst from polyether polyols is disclosed which uses alkali metal compounds and phosphorous compounds to precipitate the residual catalyst, which may then be removed by filtration. In one embodiment, a propylene oxide polyol is treated with sodium metal dispsersion, capped with ethylene oxide, treated with magnesium silicate, and then filtered to remove at least a portion of the catalyst. Substantially complete catalyst removal is then achieved by treating the polyol with hypophosphorous or phosphorous acid to precipitate the remaining solubilized double metal cyanide complex catalyst residue, neutralizing the excess acid with magnesium silicate, and filtering.

38 Claims, No Drawings

PURIFICATION OF POLYOLS PREPARED USING DOUBLE METAL CYANIDE COMPLEX CATALYSTS

This invention relates to the purification of polyols which have been prepared using double metal cyanide complex compounds as catalyst. More specifically, the invention pertains to the removal of double metal cyanide complex catalyst residues from polyols.

Double metal cyanide compounds are known to be extremely active catalysts for the polymerization of epoxides. Such catalysts have been found to be especially useful for the preparation of polyether polyols. Polyether polyols produced in this manner generally have lower levels of unsaturation and hence higher average functionality than polyols obtained using conventional base-catalyzed methods. Polyether polyols may be employed in a variety of applications, including polyurethane foams and elastomers.

In spite of the usefulness of the double metal cyanide complex catalysts, the prior art has recognized that it is desirable to remove the catalyst from the polyol following polymerization. U.S. Pat. No. 4,355,188 (Herold et al) teaches that the residual catalyst catalyzes allophanate formation when the polyol is reacted with an isocyanate and also promotes the formation of undesirable volatile by-products during storage.

U.S. Pat. No. 4,355,188 further teaches that removal of the catalyst residue may be accomplished by treating the crude polyol with a strong base such as an alkali metal hydroxide or alkali metal dispersion and then passing the polyol through an anionic exchange resin.

U.S. Pat. No. 4,721,818 (Harper et al) teaches that catalyst removal is achieved by reacting the crude polyol with an alkali metal hydride so as to convert the double metal cyanide complex catalyst into an insoluble species which can then be removed by filtration. An adsorbent such as magnesium silicate may be employed to remove any excess alkali metal hydride remaining.

Although the prior art methods generally work well for the removal of most of the double metal cyanide complex catalyst residue, minor amounts of soluble metal-containing compounds derived from the double metal cyanide complex catalyst tend to remain in the polyol after treatment using the prior art procedures. For reasons which are not well understood, the amount of residual solubilized catalyst following purification by the prior art processes will vary from batch to batch. Retreatment of the polyol using the prior art methods has been found to be generally ineffective in further reducing the level of residual solubilized catalyst. Because of the polyol stability and isocyanate reactivity problems caused by the residual catalyst, it obviously is desirable to remove as much of the catalyst as possible from the polyol.

The present invention solves the deficiencies of the prior art processes by achieving more consistent and reliable removal of substantially all of the residual double metal cyanide complex catalyst from a polyol. In the process of this invention, a polyol is treated with an alkali metal compound and a phosphorous compound selected from pyrophosphorous acid ($H_4P_2O_5$), hypophosphorous acid ($H_3PO_2$), phosphorous acid ($H_3PO_3$), and the corresponding ester and halide derivatives which yield the parent acid upon hydrolysis. The alkali metal compound and the phosphorous compound react with the double metal cyanide complex catalyst to form precipitates which are readily removed from the polyol by filtration. In addition, if the polyol has been exposed to air at elevated temperature during its preparation, purification in accordance with the process of this invention also helps to reduce the color and active oxygen content of the polyol.

This invention provides a method for removing double metal cyanide complex catalyst residue from a crude polyol which comprises the steps of (a) treating the crude polyol with an alkali metal compound selected from the group consisting of alkali metals, alkali metal hydroxides, alkali metal hydrides, and alkali metal alkoxides in an amount sufficient to convert the double metal cyanide complex catalyst into an insoluble portion and a soluble portion, (b) filtering the polyol to remove the insoluble portion, (c) treating the filtered polyol with a phosphorous compound selected from the group consisting of pyrophosphorous acid, hypophosphorous acid, phosphorous acid, and the corresponding ester and halide derivatives which yield the parent acid upon hydrolysis, in an amount sufficient to convert the soluble portion to a second insoluble portion, and (d) filtering to remove the second insoluble portion.

Any crude polyol prepared using a double metal cyanide complex catalyst can be purified according to the process of this invention. Suitable crude polyols are typically prepared by polymerization of an epoxide or mixture of epoxides in the presence of a double metal cyanide complex catalyst and an initiator having at least one hydroxyl or other active hydrogen group.

Any suitable epoxide may be employed. Suitable epoxides include propylene oxide, ethylene oxide, and 1,2-butylene oxide, or mixtures thereof. Examples of suitable initiators include trihydroxy compounds such as trimethylol propane, glycerin, and their alkoxylated derivatives, dihydroxy compounds such as ethylene glycol, propylene glycol, and their low molecular weight oligomers such as tipropylene glycol, monohydroxy compounds such as methanol, ethanol, and allyl alcohol, as well as amines, water, and enolizable ketones such as acetone. The polymerization may be carried out in suitable solvent; ethers such as tetrahydrofuran are particularly preferred.

Any suitable double metal cyanide complex catalyst may also be used. Such catalysts may be prepared by several methods. The composition of the catalyst affects the polymerization activity and may be varied considerably by changing starting reagents and the method of preparation and purification. One example of a catalyst particularly well suited for the preparation of propylene oxide polyols of low polydispersity and unsaturation is a zinc hexacyanocobaltate complex catalyst having the general formula:

$$Zn_3[Co(CN)_6]_2 \cdot x\, ZnCl_2 \cdot y\, glyme \cdot z\, H_2O$$

wherein x, y and z will vary depending on the exact method of preparation. The process of this invention provides a means for removing the metallic compounds derived from both the double metal cyanide and metal cocatalyst (e.g., $ZnCl_2$) portions of the complex catalyst.

The preparation of double metal cyanide complex catalysts and the use of such catalysts in the polymerization of epoxides to form polyols are described in detail in U.S. Pat. Nos. 4,472,560 and 4,477,589 to Shell Chemical Company and U.S. Pat. Nos. 3,404,109; 3,829,505; 3,900,518; 3,941,849 and 4,355,188 to General Tire and Rubber. The teachings of the foregoing patents are incorporated herein by reference.

The exact form and structure of the double metal cyanide complex catalyst when polymerization is completed is not known. The catalyst is not active when first contacted with epoxide and typically exhibits an initiation or induction period during which little or no epoxide conversion takes place. Immediately following activation, little, if any, of the catalyst cannot be removed by conventional filtration. However, as further epoxide conversion occurs and the polyol molecular weight increases, a substantial portion of the catalyst becomes "dissolved" in the polyol, and cannot be removed by filtration alone. The process of this invention facilitates the removal of all of the residual double metal cyanide complex catalyst, as is demonstrated by the examples provided.

According to this invention, the crude polyol is first treated with an alkali metal compound. Any suitable alkali metal compound can be used. Preferred alkali metal compounds include sodium metal, potassium metal, sodium hydride, potassium hydride, sodium hydroxide, potassium hydroxide, sodium methoxide, potassium methoxide and their mixtures.

The amount of alkali metal compound used will be that amount sufficient to convert at least a portion of the double metal cyanide complex catalyst to an insoluble portion which can be removed by filtration. The amount required will vary considerably and will depend on the catalyst concentration and polyol molecular weight and functionality. In general, however, the weight ratio of double metal cyanide complex catalyst to alkali metal compound will be between 1:200 and 10:1, preferably between 1:10 and 2:1. To increase the rate at which the alkali metal compound reacts with the double metal cyanide complex catalyst, the mixture may be heated and stirred. Heating to a temperature within the range of between 40° and 150° C. has been found to provide reaction times of less than 5 hours.

In addition to reacting with the double metal cyanide complex catalyst to form a precipitate, the alkali metal compound will also react to some extent with the terminal hydroxyl groups of the polyol to form alkoxides. In one embodiment of the invention, the polyol may be reacted with ethylene oxide following treatment with the alkali metal compound so as to provide an ethylene oxide-capped polyol having at least some fraction of primary hydroxyl end-groups. Direct ethylene oxide end-capping of propylene oxide polyols using double metal cyanide complex catalysis is not feasible due to the high reactivity of ethylene oxide and the consequent tendency to form highly ethoxylated by-products which are inhomogeneous with the remainder of the polyol. If end-capping with ethylene oxide is desired, it is preferred to strip the polyol of volatile compounds before introduction of the ethylene oxide if the alkali metal compound is a hydroxide of alkoxide. This procedure minimizes the formation of ethylene oxide homopolymer which otherwise results from the introduction of water or alcohol with these reagents. The stripping may be accomplished by heating the polyol under vacuum; addition of an agent such as a hydrocarbon which forms an azeotrope with the volatile compound to be removed is preferred.

Following treatment with the alkali metal compound and, if desired, ethylene oxide, the polyol may be filtered to remove the insoluble portion derived from the double metal cyanide complex catalyst. A filter aid such as diatomaceous earth may be advantageously employed to enhance the rate and efficiency of the filtration. The filtration rate may also be increased by heating the treated polyol or by diluting the polyol with a suitable solvent such as tetrahydrofuran or hexane to lower viscosity. An adsorbent may also be added to adsorb any excess alkali metal compound and to neutralize any polyol alkoxide groups. Examples of suitable adsorbents include magnesium silicate, aluminum silicate, and cationic exchange resin. A minor amount of water may be added with the adsorbent.

After filtration, the polyol is treated with a phosphorous compound to precipitate a second insoluble portion derived from the double metal cyanide complex catalyst. Preferred phosphorous compounds include hypophosphorous acid ($H_3PO_2$) and phosphorous acid ($H_3PO_3$). The ester and halide derivatives of hypophosphorous acid and phosphorous acid are suitable phosphorous compounds for use in this invention when the polyol is treated with water at the same time, since such derivatives will hydrolyze to yield the parent acids in situ. Examples of suitable ester and halide derivatives include triethyl phosphite and phosphorus trichloride. Similarly, pyrophosphorous acid may be used in the process of the invention if water is present in the polyol, as hydrolysis to phosphorous acid will take place. It was surprising that compounds such as hypophosphorous acid and phosphorous acid were found to be effective in the process of this invention since other phosphorus compounds such as phosphoric acid ($H_3PO_4$) were found to be generally ineffective.

The weight ratio of phosphorous compound to solubilized metal required to achieve complete precipitation will vary, but will generally be between 1:1 and 100:1. The polyol may be heated and stirred to increase the rate of precipitate formation. Temperatures between 40° and 125° C. have been found to be generally suitable. The extent of reaction may be monitored visually by the amount of insoluble precipitate present in the polyol, which generally is clear before treatment with the phosphorous compound. A small amount of water may be introduced with the phosphorous compound. If pyrophosphorous acid or an ester or halide derivative of hypophosphorous or phosphorous acid is used, sufficient water must be present in the polyol so that hypophorous acid or phosphorous acid is generated by hydrolysis.

If desired, the polyol may then be treated with an adsorbent to remove any excess phosphorous compound and thus neutralize the polyol. Suitable adsorbents include magnesium silicate, aluminum silicate, anionic exchange resin, and insoluble basic oxides, hydroxides, or carbonates such as magnesium oxide or calcium carbonate. A small amount of water may also be added. The treatment is advantageously carried out at a temperature of 40° to 15020 C.

The next step of the process according to this invention is filtration to remove the insoluble precipitate derived from the double metal cyanide complex catalyst and any adsorbent, if one is used. A filter aid such as diatomaceous earth may be used to increase filtration rate and promote removal of fine solids. The polyol may be heated or diluted with a suitable solvent to lower its viscosity and enhance the rate of filtration. Following filtration, the polyol may be heated and stripped under vacuum to remove any water or solvent introduced during purification.

In another embodiment of the invention, the polyol may be treated with the phosphorous compound immediately after treatment with the alkali metal compound. A single filtration to remove all of the insoluble compounds derived from the double metal cyanide complex catalyst as well as any adsorbent used is then performed.

The polyols obtained by the process of this invention are generally clear and colorless, low in odor, substantially free of any metals derived from the double metal cyanide complex catalyst, and suitable for use in polyurethane formulations. No undesired decomposition of the polyol due to the phosphorous compound treatment step is normally observed. In fact, any color or active oxygen present in the polyol before treatment with the phosphorous compound as a result of exposure to air tends to be reduced significantly.

The following examples further demonstrate the method of the invention.

EXAMPLES

Treatment of Crude Polyether Polyols Containing Residual Double Metal Cyanide Complex Catalyst With Alkali Metal and Adsorbent Polyols A and B were obtained by reacting 10,000 molecular weight propylene oxide triols containing 500 ppm zinc hexacyanocobaltate/zinc chloride/glyme/water catalyst with 2750 ppm 40% sodium metal dispersion, followed by addition of ethylene oxide. The ethylene oxide capped polyols were then treated with 2-3 weight % magnesium silicate for several hours at 110° C. after adding 0.5-1.0% water. After careful filtration through a cake of diatomaceous earth filter aid, Polyol A contained 7 ppm cobalt and 32 ppm zinc while Polyol B contained 13 ppm cobalt, 55 ppm zinc, and 9 ppm sodium. Before treatment in this manner, Polyols A and B contained approximately 55 ppm cobalt and 125 ppm zinc. Polyols A and B were further treated as described in Examples 1-13 below.

EXAMPLES 1-6

To demonstrate the effectiveness of the process of this invention, Polyols A and B were retreated by adding the amount of hypophosphorous or phosphorous acid shown in Table I and heating under a nitrogen atmosphere. The polyols were then treated with 2 weight % magnesium silicate for 3-4 hours at 110° C. and filtered warm (70° C.) through a cake of diatomaceous earth filter aid. In example 5, 0.2% powdered activated carbon was also added before filtration. These examples show that the process of this invention significantly reduces the amount of double metal cyanide complex catalyst residue remaining in the polyols.

COMPARATIVE EXAMPLE 7

To demonstrate that the process of the invention enhances catalyst removal, Polyol B was heated with magnesium silicate along for 3-4 hours at 110° C. and then filtered. As shown in Table II the levels of zinc and cobalt in the polyol were lowered only slightly from the initial values.

COMPARATIVE EXAMPLES 8-9

To demonstrate that mineral acids other than hypophosphorous acid, phosphorous acid and their esters are not effective in the process of the invention. Polyol A was treated with phosphoric acid and magnesium silicate under conditions similar to those used in examples 1-6. As shown in Table II, high levels of double metal cyanide complex catalyst residue remained in the polyols after treatment.

COMPARATIVE EXAMPLE 10

To demonstrate that the activated carbon used in example 5 was not responsible for catalyst removal, Polyol B was heated with activated carbon alone and then filtered. As shown in Table II, the level of residual catalyst, as measured by ppm Co+Zn, remained high.

COMPARATIVE EXAMPLES 11-13

To demonstrate that retreatment of the polyol with an alkali metal compound and magnesium silicate in accordance with the methods of the prior art is generally not effective in removing residual solubilized catalyst, Polyol B was reacted with sodium metal dispersion, sodium hydroxide, or potassium hydroxide and then magnesium silicate (3 hr., 100° C.). In Example 11, the polyol was also reacted with water before treating with magnesium silicate. After filtration, the polyols thus obtained were considerably darker in color than before retreatment and still contained high levels of cobalt and zinc.

TABLE I

| Examples of the Process of the Invention | | | | | | |
|---|---|---|---|---|---|---|
| Example Number | 1 | 2 | 3 | 4 | 5 | 6 |
| Polyol | A | A | B | B | B | B |
| Hypophosphorous Acid, ppm | 660 | 580 | 680 | 1400 | 1350 | — |
| Phosphorous Acid, ppm | — | — | — | — | — | 1400 |
| Reaction Temp., °C. | 70 | 70 | 70 | 70 | 70 | 70 |
| Reaction Time, hr. | 2 | 5.5 | 1.25 | 3 | 3 | 3 |
| Co, ppm | 3 | 4 | 9 | 4 | <2 | 7 |
| Zn, ppm | 2 | 8 | 14 | 4 | <2 | 13 |
| Na, ppm | 1.4 | 2 | 2 | 1 | 0.5 | 3 |

TABLE II

| Comparative Examples | | | | |
|---|---|---|---|---|
| Comparative Example Number | 7 | 8 | 9 | 10 |
| Polyol | B | A | A | B |
| Treating Agent | none | H3PO4 | H3PO4 | act. carbon |
| ppm | — | 1200 | 660 | 2000 |
| Reaction Temp., °C. | — | 80 | 70 | 60 |
| Reaction Time, hr. | — | 3 | 2 | 1 |
| Magnesium Silicate, % | 2 | 2 | 2 | — |
| Co, ppm | 10 | 8 | 6 | 9 |
| Zn, ppm | 49 | 30 | 23 | 42 |
| Na, ppm | 5 | 12 | 6 | 4 |

TABLE III

| Comparative Examples | | | |
|---|---|---|---|
| Comparative Example Number | 11 | 12 | 13 |
| Polyol | B | B | B |
| Treating Agent | Na/H2O | NaOH | KOH |
| ppm | 1400/5000 | 2100 | 2700 |
| Reaction Temp., °C. | 75/75 | 75 | 75 |
| Reaction Time, hr. | 2/1 | 2 | 2 |
| Magnesium Silicate, % | 2 | 2 | 2 |
| Co, ppm | 8 | 3 | 3 |
| Zn, ppm | 45 | 30 | 25 |

The data of Table I show that the amount of a double metal cyanide complex catalyst remaining in a polyol which has been first treated with an alkali metal and an adsorbent is significantly reduced by treating the polyol with hypophosphorous acid or phosphorous acid and filtering in accordance with the process of this invention. The results shown in Table II demonstrate that treatment with phosphoric acid, activated carbon, or magnesium silicate alone is not effective. Similarly, the data of Table III indicate that retreatment of the polyol with a strong base of alkali metal and an adsorbent in accordance with the methods of the prior art does not accomplish the reduction in residual catalyst levels which results from the process of this invention.

Accordingly, the process of this invention provides polyols having low levels of residual double metal cyanide complex catalyst and which are suitable for use in polyurethane applications.

I claim:

1. A process for purifying a polyol containing a double metal cyanide complex catalyst which comprises the steps of:
   (a) treating the polyol with at least one alkali metal compound selected from the group consisting of alkali metals, alkali metal hydroxides, alkali metal hydrides, and alkali metal alkoxides in an amount sufficient to convert the double metal cyanide complex catalyst into an insoluble portion and a soluble portion and to convert at least a portion of the polyol hydroxyl groups to alkoxide groups,
   (b) filtering the treated polyol to remove the insoluble portion,
   (c) further treating the filtered polyol with a sufficient amount of at least one phosphorous compound to convert the soluble portion of the double metal cyanide complex catalyst produced in step (a) to a second insoluble portion, said phosphorous compound selected from the group consisting of pyrophosphorous acid, hypophosphorous acid, phosphorous acid, and compounds having the formula

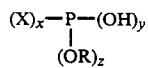

wherein R is linear or branched alkyl, phenyl, or substituted phenyl, X is Cl or Br, x is 0, 1, 2, or 3, y is 0, 1, or 2, z is 0, 1, 2, or 3, and the sum of $x+y+z$ is 3, with the proviso that the filtered polyol additionally be treated with water when the phosphorous compound is pyrophosphorous acid or when x is 1, 2, or 3, or z is 1, 2, or 3,
   (d) filtering the phosphorous compound-treated polyol to remove the second insoluble portion of the double metal cyanide complex catalyst produced in step (c), and
   (e) recovering the resulting purified polyol 2. The process of claim 1 wherein the phosphorous compound is hypophosphorous acid.

3. The process of claim 1 wherein the phosphorous compound is phosphorous acid.

4. The process of claim 1 wherein step (b) is performed in the presence of a filter aid.

5. The process of claim 1 wherein step (d) is performed in the presence of a filter aid.

6. The process of claim 1 wherein the double metal cyanide complex catalyst is a zinc hexacyanocobaltate complex catalyst.

7. The process of claim 1 wherein the polyol is poly(propylene glycol).

8. The process of claim 1 wherein the polyol is a random copolymer of propylene oxide and ethylene oxide.

9. The process of claim 1 wherein the alkali metal compound is potassium hydroxide.

10. The process of claim 1 wherein the alkali metal compound is sodium methoxide.

11. The process of claim 1 wherein the alkali metal compound is sodium metal.

12. The process of claim 1, comprising the additional step of contacting the polyol after step (a) and before step (b) with an adsorbent agent in an amount sufficient to adsorb any excess of the alkali metal compound and to convert the polyol alkoxide groups to hydroxyl groups.

13. The process of claim 1, comprising the additional step of contacting the polyol after step (c) and before step (d) with an adsorbent agent in an amount sufficient to adsorb any excess of the phosphorous compound.

14. The process of claim 1, comprising the additional step of contacting the polyol with ethylene oxide after step (a) and before step (b) in an amount sufficient to form an ethylene oxide-capped polyol having a substantial portion of hydroxyl end groups which are primary.

15. A process for purifying a polyol containing a double metal cyanide complex catalyst which comprises the steps of:
   (a) treating the polyol with at least one alkali metal compound selected from the group consisting of alkali metals, alkali metal hydroxides, alkali metal hydrides, and alkali metal alkoxides in an amount sufficient to convert the double metal cyanide complex catalyst into a first insoluble portion and a soluble portion and to convert at least a portion of the polyol hydroxyl groups to alkoxide groups,
   (b) further treating the polyol obtained in step (a) with a sufficient amount of at least one phosphorous compound to convert the soluble portion of the double metal cyanide complex catalyst to a second insoluble portion, said phosphorous compound selected form the group consisting of pyrophosphorous acid, hypophosphorous acid, phosphorous acid, and compounds having the formula

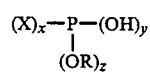

wherein R is linear or branched alkyl, phenyl, or substituted phenyl, X is Cl or Br, x is 0, 1, 2, or 3, y is 0, 1, or 2, z is 0, 1, 2, or 3, and the sum of $x+y+z$ is 3, with the proviso that the filtered polyol additionally be treated with water when the phosphorous compound is pyrophosphorous acid or when x is 1, 2, or 3 or when z is 1, 2, or 3,
   (c) filtering the treated polyol to remove the first and second insoluble portions of the double metal cyanide complex catalyst, and
   (d) recovering the resulting purified polyol.

16. The process of claim 15 wherein the phosphorous compound is hypophosphorous acid.

17. The process of claim 15 wherein the phosphorous compound is phosphorous acid.

18. The process of claim 15 wherein step (c) is performed in the presence of a filter aid.

19. The process of claim 15 wherein the double metal cyanide complex catalyst is a zinc hexacyanocobaltate complex catalyst.

20. The process of claim 15 wherein the polyol is poly(propylene glycol).

21. The process of claim 15 wherein the polyol is a random copolymer of propylene oxide and ethylene oxide.

22. The process of claim 15 wherein the alkali metal compound is potassium hydroxide.

23. The process of claim 15 wherein the alkali metal compound is sodium methoxide.

24. The process of claim 15 wherein the alkali metal compound is sodium metal.

25. The process of claim 15, comprising the additional step of contacting the polyol after step (b) and before step (c) with at least one adsorbent agent in an amount sufficient to adsorb any excess of the alkali metal compound, convert the polyol alkoxide groups to hydroxyl groups, and adsorb any excess of the phosphorous compound.

26. The process of claim 15, comprising the additional step of contacting the polyol with ethylene oxide after step (a) and before step (b) in an amount sufficient to form an ethylene oxide-capped polyol having a substantial portion of hydroxyl and groups which are primary.

27. A process for purifying a polyol containing a double metal cyanide complex catalyst which comprises the steps of:
  (a) treating the polyol with at least one metal compound selected from the group consisting of alkali metals, alkali metal hydroxides, alkali metal hydrides, and alkali metal alkoxides in an amount sufficient to convert the double metal cyanide complex catalyst into an insoluble portion and a soluble portion and to convert at least a portion of the polyol hydroxyl groups to alkoxide groups,
  (b) contact the treated polyol with a first adsorbent agent in an amount sufficient to adsorb any excess of the alkali metal compound and to convert the polyol alkoxide groups to hydroxyl groups,
  (c) filtering the polyol to remove the insoluble portion of the double metal cyanide complex catalyst and the adsorbent agent containing adsorbed excess alkali metal compound,
  (d) treating the filtered polyol with a phosphorous compound selected from the group consisting of hypophosphorous acid and phosphoric acid in an amount sufficient to convert the soluble portion of the double metal cyanide complex catalyst to a second insoluble portion,
  (e) contacting the polyol with a second adsorbent agent in an amount sufficient to adsorb any excess of the phosphorous compound,
  (f) filtering the polyol to remove the second insoluble portion of the double metal cyanide complex catalyst and the second adsorbent agent containing adsorbed excess phosphorous compound, and
  (g) recovering the resulting purified polyol.

28. The process of claim 27 wherein step (c) is performed in the presence of a filter aid.

29. The process of claim 27 wherein step (f) is performed in the presence of a filter aid.

30. The process of claim 27 wherein the double metal cyanide complex catalyst is a zinc hexacyanocobaltate complex catalyst.

31. The process of claim 27 wherein the polyol is poly(propylene glycol).

32. The process of claim 27 wherein the polyol is a random copolymer of propylene oxide and ethylene oxide.

33. The process of claim 27 wherein the alkali metal compound is potassium hydroxide.

34. The process of claim 27 wherein the alkali metal compound is sodium methoxide.

35. The process of claim 27 wherein the alkali metal compound is sodium metal.

36. The process of claim 27, comprising the additional step of contacting the polyol with ethylene oxide after step (a) and before step (b) in an amount sufficient to form an ethylene oxide-capped polyol having a substantial portion of hydroxyl end groups which are primary.

37. A process for purifying poly(propylene glycol) containing a zinc hexacyanocobaltate complex catalyst which comprises the steps of:
  (a) treating the poly(propylene glycol) with at least one alkali metal compound selected from the group consisting of sodium metal, potassium hydroxide, and sodium methoxide in an amount sufficient to convert the zinc hexacyanocobaltate complex catalyst into an insoluble portion and a soluble portion and to convert at least a portion of the poly(propylene glycol) hydroxyl groups to alkoxide groups,
  (b) contacting the treated poly(propylene glycol) with magnesium silicate in an amount sufficient to adsorb any excess of the alkali metal compound and to convert the poly(propylene glycol) alkoxide groups to hydroxyl groups,
  (c) filtering the poly(propylene glycol) in the presence of a filter aid to remove the insoluble portion of the zinc hexacyanocobaltate complex catalyst and the magnesium silicate containing adsorbed excess alkali metal compound,
  (d) treating the filtered poly(propylene glycol) with a phosphorous compound selected from the group consisting of hypophosphorous acid and phosphorous acid in an amount sufficient to convert the soluble portion of the zinc hexacyanocobaltate complex catalyst to a second insoluble portion,
  e) contacting the poly(propylene glycol) with additional magnesium silicate in an amount sufficient to adsorb any excess of the phosphorous compound,
  (f) filtering the poly(propylene glycol) in the presence of a filter aid to remove the second insoluble portion of the zinc hexacyanocobaltate complex catalyst and the additional magnesium silicate containing adsorbed excess phosphorous compound, and
  (g) recovering the resulting purified poly(propylene glycol).

38. The process of claim 27, comprising the additional step of contacting the poly(propylene glycol) with ethylene oxide after step (a) and before step (b) in an amount sufficient to form an ethylene oxide-capped poly(propylene glycol) having a substantial portion of hydroxy end groups which are primary.

* * * * *